(12) United States Patent
Harker et al.

(10) Patent No.: US 11,960,119 B2
(45) Date of Patent: Apr. 16, 2024

(54) OPTICAL WAVEGUIDE ADAPTER ASSEMBLY

(71) Applicant: Microsoft Technology Licensing, LLC, Redmond, WA (US)

(72) Inventors: Andrew Thomas Harker, Romsey (GB); Michael Fake, Romsey (GB); Simon Bawn, Romsey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/281,327

(22) PCT Filed: Oct. 2, 2019

(86) PCT No.: PCT/GB2019/052771
§ 371 (c)(1),
(2) Date: Mar. 30, 2021

(87) PCT Pub. No.: WO2020/070487
PCT Pub. Date: Apr. 9, 2020

(65) Prior Publication Data
US 2021/0396931 A1 Dec. 23, 2021

(30) Foreign Application Priority Data
Oct. 3, 2018 (GB) .................................... 1816143

(51) Int. Cl.
*G02B 6/14* (2006.01)
*G02B 6/02* (2006.01)
(Continued)

(52) U.S. Cl.
CPC ............ *G02B 6/14* (2013.01); *G02B 6/02328* (2013.01); *G02B 6/1228* (2013.01); *G02B 6/255* (2013.01); *G02B 2006/12152* (2013.01)

(58) Field of Classification Search
CPC ..................... G02B 6/14; G02B 2006/12152
See application file for complete search history.

(56) References Cited

U.S. PATENT DOCUMENTS

| 5,515,464 A | 5/1996 | Sheem |
| 6,336,749 B1 | 1/2002 | O'Toole et al. |
| (Continued) | | |

FOREIGN PATENT DOCUMENTS

| CN | 101368979 | 2/2009 |
| CN | 102866462 A | 1/2013 |
| (Continued) | | |

OTHER PUBLICATIONS

J. Wooler et al., "Overcoming the Challenges of Splicing Dissimilar Diameter Solid-Core and Hollow-Core Photonic Band Gap Fibers," Workshop on Speciality Optical Fibers and their Applications, Optical Society of America, 2013.
(Continued)

*Primary Examiner* — Eric Wong (57) ABSTRACT

An optical waveguide adapter assembly comprises a solid core optical waveguide extending between a free end and a coupled end and having a solid waveguiding core with an associated first optical mode field size; a hollow core optical waveguide extending between a free end and a coupled end and having a hollow waveguiding core with an associated second optical mode field size; and an optical mode field adapter extending between a first end and a second end and having a waveguiding core configured to change an optical mode field of a waveguided optical signal substantially between the first optical mode field size at the first end of the optical mode field adapter and the second optical mode field size at the second end of the optical mode field adapter, the first end of the optical mode field adapter joined to the coupled end of the solid core optical waveguide to provide optical coupling between the waveguiding core of the solid (Continued)

core optical waveguide and the waveguiding core of the optical mode field adapter, and the second end of the optical mode field adapter joined to the coupled end of the hollow core optical waveguide to provide optical coupling between the waveguiding core of the hollow core optical waveguide and the waveguiding core of the optical mode field adapter.

22 Claims, 7 Drawing Sheets

(51) Int. Cl.
  *G02B 6/122* (2006.01)
  *G02B 6/255* (2006.01)
  *G02B 6/12* (2006.01)

(56) References Cited

U.S. PATENT DOCUMENTS

| | | | |
|---|---|---|---|
| 6,839,483 | B2 | 1/2005 | Reed et al. |
| 9,904,008 | B2 | 2/2018 | Fokoua et al. |
| 2006/0165361 | A1 | 7/2006 | Hongo |
| 2007/0237453 | A1* | 10/2007 | Nielsen .............. G02B 6/262 385/28 |
| 2009/0202204 | A1* | 8/2009 | Nielsen .............. G02B 6/2856 264/1.25 |
| 2012/0219301 | A1 | 8/2012 | Koch et al. |
| 2018/0224607 | A1 | 8/2018 | Bookbinder et al. |
| 2019/0011634 | A1* | 1/2019 | Lyngsøe ............ G02B 6/02328 |
| 2019/0219766 | A1 | 7/2019 | Watanabe |

FOREIGN PATENT DOCUMENTS

| | | |
|---|---|---|
| CN | 104483735 A | 4/2015 |
| CN | 204256211 U | 4/2015 |
| CN | 105487173 A | 4/2016 |
| CN | 106575012 A | 4/2017 |
| CN | 108919416 | 11/2018 |
| GB | 2526879 | 12/2015 |
| JP | H0659150 A | 3/1994 |
| JP | 2002243971 A | 8/2002 |
| JP | 2004-061830 A | 2/2004 |
| JP | 2005-024847 A | 1/2005 |
| JP | 2005-345592 A | 12/2005 |
| JP | 2008032993 A | 2/2008 |
| JP | 2013-200479 A | 10/2013 |
| JP | 2014512722 A | 5/2014 |
| JP | 2017015881 | 1/2017 |
| JP | 2017-520804 A | 7/2017 |
| KR | 101377438 | 3/2014 |
| WO | 2004111695 | 12/2004 |
| WO | 2010077581 | 7/2010 |
| WO | 2012115780 A1 | 8/2012 |
| WO | 2012/172718 A1 | 12/2012 |
| WO | 2015185761 | 12/2015 |
| WO | 2017/032454 A1 | 3/2017 |
| WO | 2018/062484 A1 | 4/2018 |

OTHER PUBLICATIONS

J Wooler et al., "Robust Low Loss Splicing of Hollow Core Photonic Bandgap Fiber to Itself," Proc. Opt. Fiber Commun. Cont., 2013.
S. E. Barkou et al, "Photonic Bandgap Fibers," LEOS '99, IEEE Lasers and Electro-Optics Society 1999 12th Annual Meeting, vol. 2 IEEE, 1999, p. 615-616.
J. Broeng et al., "Analysis of air-guiding photonic bandgap fibers," Optics Letters vol. 25(2), 96-98, 2000.
Francesco Poletti, "Nested antiresonant nodeless hollow core fiber," Opt. Express, vol. 22, 23807-23828, 2014.
J.R. Hayes et al., "Antiresonant Hollow Core Fiber with an Octave Spanning Bandwidth for Short Haul Data Communications," Journal of Lightwave Technology vol. 35(3), 437-442, 2017.
P. Hofman et al., "Detailed Investigation of Mode-Field Adapters Utilizing Multimode-Interference in Graded Index Fibers," Journal of Lightwave Technology, vol. 30(14), 2289-2298, 2012.
M. Faucher and Y.K. Lize, "Mode Field Adaptation for High Power Fiber Lasers," Conference on Lasers and Electro-Optics, Optical Society of America, 2007.
D.B. Mortimore and J.V. Wright, "Low-Loss Joints Between Dissimilar Fibres by Tapering Fusion Splices," Electronics Letters vol. 22(6), 318-319, 1986.
International Search Report and Written Opinion for corresponding International Patent Application No. PCT/GB2019/052771, dated Nov. 26, 2019.
UK Combined Search and Examination Report, issued in Application No. GB1816143.0, dated Mar. 27, 2019.
S. Choi, W. Shin, and K. Oh, "Higher-Order-Mode Dispersion Compensation Technique Based on Mode Converter using Hollow Optical Fiber," in Optical Fiber Communications Conference, A. Sawchuk, ed., vol. 70 of OSA Trends in Optics and Photonics (Optical Society of America, 2002), pp. 177-178.
Original and English translation of Japanese Office Action issued for corresponding Japanese National Stage Application No. 2021-543584 dated Apr. 25, 2022.
"Integrated Wiring Construction Technology", Published in Beijing Institute of Technology, Apr. 30, 2017, 6 Pages.
"Third Office Action and Search Report Issued in Chinese Patent Application No. 201980065378.0", dated Mar. 31, 2023, 9 Pages.
"Office Action Issued in Japanese Patent Application No. 2021-543584", dated Apr. 26, 2023, 7 Pages.
"Office Action Issued in Chinese Patent Application No. 201980065378. 0", dated Jun. 8, 2023, 13 Pages.
"Written Opinion Issued in Singapore Application No. 11202103114V", dated Sep. 19, 2022, 9 Pages.
"Office Action Issued in Chinese Patent Application No. 201980065378. 0", dated Jun. 27, 2022, 12 Pages.
"Office Action Issued in Chinese Patent Application No. 201980065378. 0", dated Dec. 9, 2022, 6 Pages.
"Office Action Issued in Japanese Patent Application No. 2021-543584", dated Oct. 31, 2022, 12 Pages.
Xiao-Qian, et al., "Fusion Splice Technique of Hollow-Core Photonic Crystal Fiber", In Journal of Navigation Positioning & Timing, vol. 4, Issue 6, Nov. 30, 2017, 5 Pages.
"Notice of Allowance Issued in Singapore Patent Application No. 11202103114V", dated Sep. 25, 2023, 6 Pages.
"Notice of Allowance Issued in Japanese Patent Application No. 2021-543584", dated Sep. 14, 2023, 5 Pages.

* cited by examiner

OPTICAL WAVEGUIDE ADAPTER ASSEMBLY

This application is a national phase of International Application No. PCT/GB2019/052771 filed on Oct. 2, 2019, which claims priority to GB Application No. 1816143.0, filed on Oct. 10, 2018, all of which are hereby incorporated by reference.

BACKGROUND OF THE INVENTION

The present invention relates to optical waveguide adapter assemblies.

An important use of optical fibres is in the transmission of data, such as in telecommunications applications, over both short and long distances. Conventionally, optical fibres having a solid waveguiding core configured for the propagation of a single optical mode (single mode or SM fibre) or multiple optical modes (multimode or MM fibre) have been used. A widely-used example is silica optical fibre carrying optical signals at a wavelength of about 1550 nm, where silica has its lowest loss so that signals can be propagated over long distances with the minimum attenuation. Optical fibres for carrying data signals can be packaged into cables including one or more fibres within an outer jacket that protects the fibres during deployment and use of the fibres.

When a cable has been installed to enable optical communication along a desired pathway, the optical fibres within the cable need to be optically and mechanically coupled to equipment at either end of the pathway, including optical transmitters and optical receivers to generate and detect optical signals. Conventionally, for solid core single mode fibre the connections are achieved by splicing each end of each fibre of the cable to corresponding fibres of the transceiver equipment in a permanent bonded joint, or by fitting mechanical connectors to the cable fibre ends (connectorisation) which can be engaged with similar connectors fitted onto fibres of the transceiving equipment. Spliced connections necessarily are made at the point of use, after a cable has been installed. Connectors can be attached either before or after cable installation. Both connectorisation and splicing are widely used and enable connections to be made rapidly and at low cost.

The growth of global data traffic has brought the fundamental limits of conventional fibres in sight, however. Together with the data transmission appetites of emerging technologies such as large-scale data centres and 5G networks and demands for precision in optical fibre applications such as sensing, metrology and timing synchronisation, this is creating a requirement for a new generation of optical fibres with superior performance. Hollow core optical fibres are an attractive option for meeting many of these needs.

Hollow core fibres provide an alternative to conventional solid core fibres by guiding light in air instead of glass. This enables data transmission at near-vacuum light speeds, at higher optical powers and over broader optical bandwidths, with relative freedom from issues such as nonlinear and thermo-optic effects that can affect optical waves travelling in solid material. Hollow core fibres can be packaged into cable formats deployable for optical data transmission in the same way as conventional fibres, but are not directly compatible with existing transceiver equipment configured for connection to solid core fibres. This presents a significant obstacle in the roll-out of hollow core fibres for data transmission. The provision of alternate transceiver equipment incorporating hollow core fibre inputs and outputs is currently a costly and impractical solution. Coupling of hollow core fibres to existing solid core equipment using conventional splicing or connectorisation techniques and tools commonly available at appropriate locations (such as data centres) is not feasible. A significant mismatch in the mode field diameters of conventional single mode fibres and hollow core fibres makes direct joining of the two fibre types unworkable. Also, the structure of a hollow core fibre creates difficulties when implementing coupling in the field. If exposed, the hollow core should be sealed to prevent ingress of contamination into the fibre, and the highly structured and delicate cladding around the core is susceptible to mechanical and thermal damage.

Accordingly, approaches enabling the use of hollow core optical fibre with solid core optical fibre-based equipment are of interest.

SUMMARY OF THE INVENTION

Aspects and embodiments are set out in the appended claims.

According to a first aspect of certain embodiments described herein, there is provided an optical waveguide adapter assembly comprising: a solid core optical waveguide extending between a free end and a coupled end and having a solid waveguiding core with an associated first optical mode field size; a hollow core optical waveguide extending between a free end and a coupled end and having a hollow waveguiding core with an associated second optical mode field size; and an optical mode field adapter extending between a first end and a second end and having a waveguiding core configured to change an optical mode field of a waveguided optical signal substantially between the first optical mode field size at the first end of the optical mode field adapter and the second optical mode field size at the second end of the optical mode field adapter, the first end of the optical mode field adapter joined to the coupled end of the solid core optical waveguide to provide optical coupling between the waveguiding core of the solid core optical waveguide and the waveguiding core of the optical mode field adapter, and the second end of the optical mode field adapter joined to the coupled end of the hollow core optical waveguide to provide optical coupling between the waveguiding core of the hollow core optical waveguide and the waveguiding core of the optical mode field adapter.

According to a second aspect of certain embodiments described herein, there is provided an optical fibre cable comprising at least one transmission hollow core optical waveguide for defining an optical signal transmission pathway, and an optical waveguide adapter assembly according to the first aspect optically coupled to at least one end of the at least one transmission hollow core optical fibre.

According to a third aspect of certain embodiments described herein, there is provided an optical signal transmission system comprising an optical signal transmitter, an optical signal receiver, an optical fibre cable housing at least one transmission hollow core optical waveguide defining an optical signal transmission pathway between the optical signal transmitter and the optical signal receiver, a first optical waveguide adapter assembly according to the first aspect optically interconnecting the transmitter and a first end of the at least one transmission hollow core optical waveguide, and a second optical waveguide adapter assembly according to the first aspect optically interconnecting the receiver and a second end of the at least one transmission hollow core optical waveguide.

According to a fourth aspect of the certain embodiments described herein, there is provided a method of installing an optical signal transmission system comprising: deploying a transmission hollow core optical waveguide to define an optical signal transmission pathway; joining an optical waveguide adapter assembly according to the first aspect to the transmission hollow core optical waveguide by forming a splice between the free end of the hollow core optical waveguide of the optical waveguide adapter assembly and a first end of the transmission hollow core optical waveguide; and joining the free end of the solid core optical waveguide of the optical waveguide adapter assembly to form an optical coupling with first optical transceiver equipment.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, optical fibre adapter assemblies may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of optical fibre assemblies and methods discussed herein which are not described in detail may be implemented in accordance with any conventional techniques for implementing such aspects and features.

Figure 1:
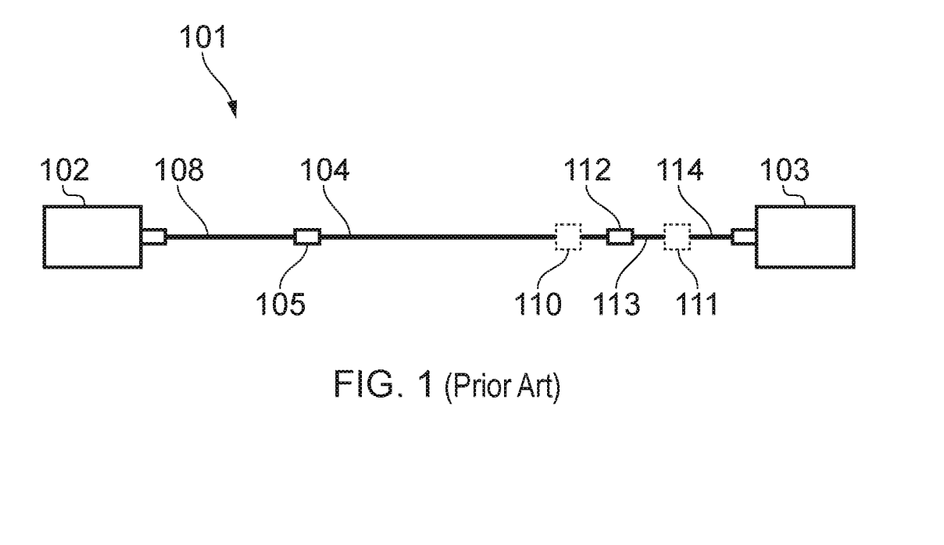
FIG. 1 shows a simplified schematic representation of a conventional optical fibre signal transmission system.

FIG. 1 shows a simplified schematic representation of a conventional optical signal transmission system 101 having an optical fibre transmission path for the transmission of optical signals between a transmitter and a receiver. The transmission path has the form of one or more silica solid core optical fibres (single mode or possibly multimode) typically housed in an optical fibre cable 104, which provides one or more layers or coatings around the fibre or fibres, which may be arranged in bundles or groups of fibres, to provide a protective jacket. A transmitter 102 configured for the generation and transmission of optical signals is positioned at a first end of the optical fibre cable 104 with an output coupled to the fibre or fibres in the cable 104 so that the optical signals can be launched in the fibre or fibres for propagation along the transmission path. A receiver 103 configured for the receipt and detection of the optical signals is similarly coupled to the fibre or fibres via an input, at a second end of the cable 104 opposite to the first end. The output of the transmitter 102 and the first end of the cable 104 are interconnected by an optical fibre 108 referred to as a patchcord. The patchcord 108 and the cable 104 are joined by a connector or connectors 105, which may be fitted to the ends of the cable 104 and the patchcord 108 either before or after installation of the cable 104 along the line of the transmission path. A similar patchcord fibre 113, 114 and connector arrangement 112 interconnects the second end of the cable 104 with the receiver 103. The optical fibres 108, 113, 114 making up the patchcords are much shorter than the cable 104, generally less than 20 meters long whereas the cable 104 can be from 100 m or less to 100 kilometres or more in length. The transmission path may further include a mode stripper, either at position 110 as a part of the cable 104, or at position 111 after the end of the cable 104 within the patchcord to that the patchcord comprises a fibre 113 between the connector 112 and the mode stripper 111 and a further fibre 114 between the mode stripper 111 and the receiver 103. A mode stripper may also be included at the transmitter end of the cable 104.

The cable 104 will likely carry optical signals in the opposite direction also, from the second end to the first end. This may be in different optical fibres within the cable 104, or as counterpropagating signals in a same fibre or fibres in the cable 104. Accordingly, the transmitter 102 may be configured also to be operable as a receiver, and the receiver 103 may be configured also to be operable as a transmitter. The terms "transceiver", "transceiver equipment" and "transceiver apparatus" may be used to include these various alternatives, and will be used herein to indicate equipment or apparatus located at an end of an optical fibre transmission path (embodied by an optical fibre or an optical fibre assembly comprising two or more fibres, or an optical fibre cable comprising two or more fibres or fibre assemblies) and operable to play a role in the transmission of optical signals into the transmission path for propagation therealong, and/or the reception of optical signals from the transmission path following propagation therealong.

In order to accommodate the evolving demands of modern optical signal transmission applications, it is desirable to replace the solid core optical fibre cable 104 of a conventional system such as that of FIG. 1 with a cable containing one or more hollow core optical fibres. Hollow core fibre cannot be practically or readily joined to existing transceiver apparatus configured with solid core fibre inputs and outputs using the conventional fibre-coupling approaches of splicing or connectorisation, however. The complex internal structure of hollow core fibre, comprising a hollow core surrounded by a structured cladding made up of multiple voids (described in more detail below) is vulnerable to damage and contamination when subject to conventional techniques for coupling solid core fibre. Also, the optical modes supported by hollow core fibres tend to be significantly mismatched to those of solid core fibres, so that a direct joint introduces substantial transmission losses, and/or is prone to launch light into undesirable higher order modes that may be guided over appreciable distances in the hollow core fibre. Further, the external physical diameters of typical solid core fibres and typical hollow core fibres can be significantly different; this also contributes to difficulties in splicing [1]. A hollow core fibre may have a diameter in excess of 200 µm (since its large mode field diameter dictates a thick glass cladding to reduce microbending and macrobending losses), whereas current single mode solid core fibre for telecommunications use has a diameter of 125 µm, and there is commercial pressure for smaller fibres.

However, while the joining of hollow core fibres to solid core fibres in transceivers and other equipment in the environment of a deployed optical fibre cable end is problematic, it has been found that splicing a length of hollow core fibre to another length of hollow core fibre in such a situation is, surprisingly, achievable and effective.

Previous work [2] has demonstrated the splicing of hollow core fibre of the photonic band gap type (described further below) to itself to produce a robust join able to survive a force of 2 N over a time period of 200 ms or longer in proof testing, and providing a low transmission loss of 0.16 dB. The present inventors have further optimised this splicing process to achieve stronger joins able to withstand forces in the region of 4 to 5 N and above, albeit at a slightly higher loss not exceeding 0.5 dB. This loss level is acceptable for a telecommunications application, and the improved strength capability indicates that the technique is suitable for use in the field, such as at a data centre. The splicing machine used is also suitable for operation in such an environment.

Figure 2:
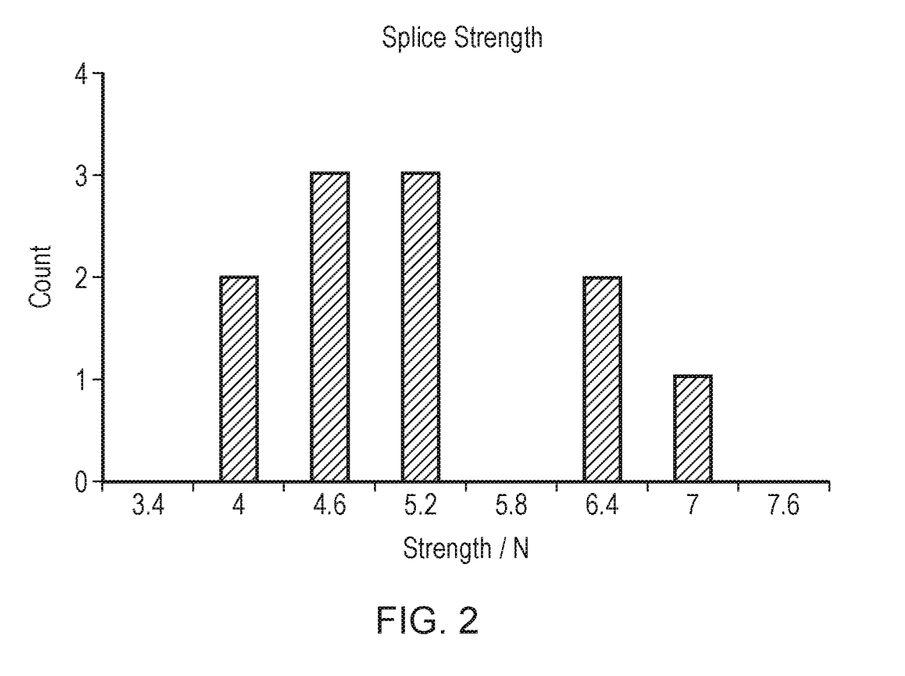
FIG. 2 shows a bar chart of results of strength testing on hollow core-to-hollow core optical fibre splices.

FIG. 2 shows a bar chart of the strengths measured by testing a group of these hollow core-to-hollow core fibre splices. The number of splices demonstrating each of several levels of breaking strength (force applied to a splice in order to cause a break) is indicated. Of eleven splices, every splice withstood a breaking force of at least 4 N, while the majority (six out of eleven) were able to withstand a force in excess of 5 N, with three splices withstanding more than 6 N. This robustness indicates that the splicing of hollow core optical fibres in the field, i.e. outside of controlled laboratory or manufacturing conditions, is highly achievable.

In light of this unexpected feasibility of in-the-field hollow core fibre splicing, the present disclosure proposes an optical waveguide adapter assembly for hollow core optical fibres, such as hollow core optical fibres comprised within optical fibre cables. The adapter assembly comprises a portion of hollow core optical fibre, a portion of solid core optical fibre, and a mode field adapter interposed between the hollow core optical fibre and the solid core optical fibre. The mode field adapter is configured to convert the size of the optical mode field supported in the solid core fibre to the size of the optical mode field supported in the hollow core fibre, and vice versa, depending on the direction of propagation of an optical signal through the adapter assembly, so that the optical signal can propagate from one fibre to the other with a reduced transmission loss compared to same fibre-to-fibre transition without the mode field adapter. The adapter assembly can be fabricated in an appropriate fabrication facility (industrial or laboratory setting, for example) that enables high quality, low loss joins to be made between the various components. The adapter assembly can then be supplied for use in the field. When an optical fibre cable comprising one or more hollow core fibres has been deployed or installed along a required pathway for optical signal transmission, the adapter assembly can be joined to the cable by splicing the free end of the hollow core fibre portion of the adapter assembly to the end of a hollow core fibre in the cable using a splice technique such as in [2] (possibly with further optimisation), and joined to transceiver equipment by splicing the free end of the solid core fibre portion of the adapter assembly to a solid core fibre input or output of the transceiver equipment or by connectorising the free end and engaging the connector to a solid core fibre connector on the equipment, according to standard solid core fibre coupling approaches. By repeating this at the opposite end of the cable, and for as many hollow core fibres in the cable as are required to implement the optical transmission pathway, hollow core optical fibres can be simply and conveniently incorporated into optical signal transmission systems.

Alternatively, adapter assemblies may be spliced to an end or ends of a hollow core fibre in a cable before the cable is deployed. After installation of the cable, it is then necessary only to connect the adapter assemblies to solid core fibres in transceiver equipment at one end of the cable to effect integration of the cable into an optical transmission system.

Hollow core optical fibre has a core in which light is guided that comprises a central void (commonly filled with air, but also alternatively with another gas or mixture of gases, or a vacuum), surrounded by a cladding comprising a structured arrangement of longitudinal capillaries extending along the fibre length. The absence of a solid glass core reduces the proportion of a guided optical wave which propagates in glass compared to a solid core fibre, offering benefits such as increased propagation speed, reduced loss from both absorption and scattering, and reduced nonlinear interactions. Hollow core fibres can be categorised according to their mechanism of optical guidance into two principal classes or types: hollow core photonic bandgap fibre (HCPBF, alternatively often referred to as hollow core photonic crystal fibres, HCPCF) [3], and antiresonant hollow core fibre (AR-HCF or ARF) [4]. There are various subcategories of ARFs characterised by their geometric structure, including kagome fibres [5, 6], nested antiresonant nodeless fibres (NANFs) [7] and tubular fibres [8]. The present disclosure is applicable to all types of hollow core fibre, including these two main classes and their associated sub-types plus other hollow core designs. Note that in the art, there is some overlapping use of terminologies for the various classes of fibre. For the purposes of the present disclosure, the term "hollow core fibre" is intended to cover all types of these fibres having a hollow core as described above. The terms "HCPBF" and "HCPCF" are used to refer to hollow core fibres which have a structure that provides waveguiding by photonic bandgap effects (described in more detail below). The terms "ARF" and "antiresonant hollow core fibre" are used to refer to hollow core fibres which have a structure that provides waveguiding by antiresonant effects (also described in more detail below).

Figure 3:
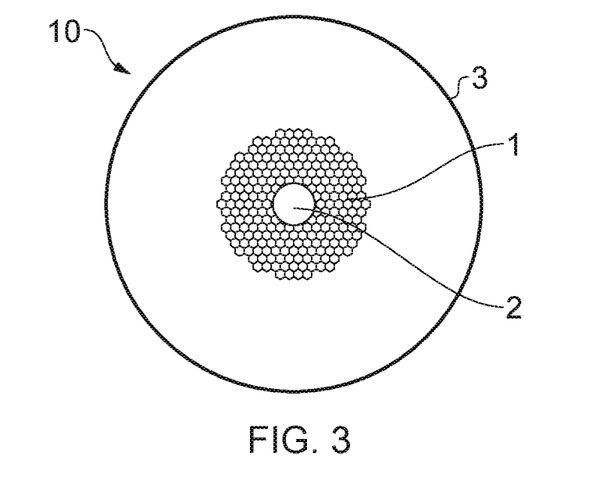
FIG. 3 shows a schematic transverse cross-sectional view of an example hollow core photonic bandgap optical fibre to which the present disclosure is applicable.

FIG. 3 shows a cross-sectional view of an example HCPBF 10. In this fibre type, the structured, inner, cladding 1 comprises a regular closely packed array of many small glass capillaries, from which a central group is excluded to define a substantially circular hollow core 2. The periodicity of the cladding structure provides a periodically structured refractive index and hence a photonic bandgap effect that confines the propagating optical wave towards the core. These fibres can be described in terms of the number of cladding capillaries or "cells" which are excluded to make the core 2. In the FIG. 3 example, the central nineteen cells from the array are absent in the core region, making this a 19-cell core HCPBF. The structured cladding 1 is formed from six rings of cells surrounding the core 2, plus some cells in a seventh ring to improve the circularity of the outer surface of the cladding. An outer cladding 3 surrounds the structured cladding 1.

In contrast to HCPBF, antiresonant hollow core fibres guide light by an antiresonant optical guidance effect. The structured cladding of ARFs has a simpler configuration, comprising a much lower number of larger glass capillaries or tubes than a HCPBF to give a structure lacking any high degree of periodicity so that photonic bandgap effects are not significant. Rather, antiresonance is provided for propagating wavelengths which are not resonant with a wall thickness of the cladding capillaries, in other words, for wavelengths in an antiresonance window which is defined by the cladding capillary wall thickness. The cladding capillaries surround a central void or cavity which provides the hollow core of the fibre, and which is able to support antiresonantly-guided optical modes. The structured cladding can also support cladding modes able to propagate primarily inside the capillaries, in the glass of the capillary walls or in the spaces or interstices between the cladding capillaries and the fibre's outer cladding. The loss of these additional non-core guided modes is generally very much higher than that of the core guided modes. The fundamental core guided mode typically has by far the lowest loss amongst the core guided modes. The antiresonance provided by a capillary wall thickness which is in antiresonance with the wavelength of the propagating light acts to inhibit coupling between the fundamental core mode and any cladding modes, so that light is confined to the core and can propagate at very low loss.

Figure 4:
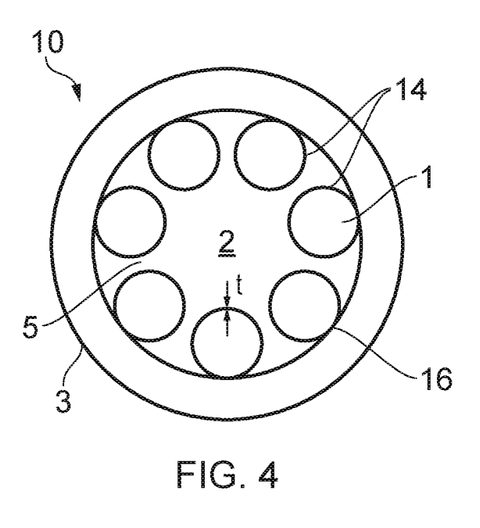
FIG. 4 shows a schematic transverse cross-sectional view of a first example antiresonant hollow core optical fibre to which the present disclosure is applicable.

FIG. 4 shows a transverse cross-sectional view of an example simple antiresonant hollow core fibre. The fibre 10 has an outer tubular cladding 3. The structured, inner, cladding 1 comprises a plurality of tubular cladding capillaries 14, in this example seven capillaries of the same cross-sectional size and shape, which are arranged inside the outer cladding 3 in a ring, so that the longitudinal axes of each cladding capillary 14 and of the outer cladding 3 are substantially parallel. Each cladding capillary 14 is in contact with (bonded to) the inner surface of the outer cladding 3 at a location 16, such that the cladding capillaries 14 are evenly spaced around the inner circumference of the outer cladding 3, and are also spaced apart from each other by gaps s (there is no contact between neighbouring capillaries). In some designs of ARF, the cladding tubes 14 may be positioned in contact with each other (in other words, not spaced apart as in FIG. 4), but spacing to eliminate this contact can improve the fibre's optical performance. The spacing s removes nodes that arise at the contact points between adjacent tubes and which tend to cause undesirable resonances that result in high losses. Accordingly, fibres with spaced-apart cladding capillaries may be referred to as "nodeless antiresonant hollow core fibres".

The arrangement of the cladding capillaries 14 in a ring around the inside of the tubular outer cladding 3 creates a central space, cavity or void within the fibre 10, also with its longitudinal axis parallel to those of the outer cladding 3 and the capillaries 14, which is the fibre's hollow core 2. The core 2 is bounded by the inwardly facing parts of the outer surfaces of the cladding capillaries 14. This is the core boundary, and the material (glass or polymer, for example) of the capillary walls that make up this boundary provides the required antiresonance optical guidance effect or mechanism. The capillaries 14 have a thickness t at the core boundary which defines the wavelength for which antiresonant optical guiding occurs in the ARF.

FIG. 4 shows merely one example of an ARF. Many other possible ARF structures may be used in an optical fibre assembly as described herein.

Figure 5:
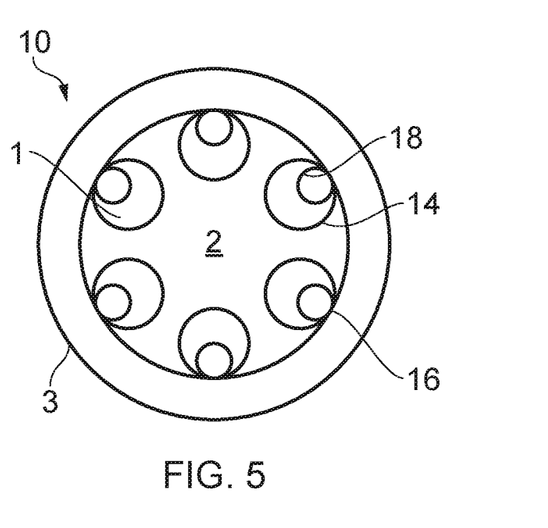
FIG. 5 shows a schematic transverse cross-sectional view of a second example antiresonant hollow core optical fibre to which the present disclosure is applicable.

FIG. 5 shows a transverse cross-sectional view of a second example ARF. The ARF has a structured inner cladding 1 comprising six cladding capillaries 14 evenly spaced apart around the inner surface of a tubular outer cladding 3 and surrounding a hollow core 2. Each cladding capillary 14 has a secondary, smaller capillary 18 nested inside it, bonded to the inner surface of the cladding capillary 14, in this example at the same azimuthal location 16 as the point of bonding between the primary capillary 14 and the outer cladding 3. These additional smaller capillaries 18 can reduce the optical loss. Additional still smaller tertiary capillaries may be nested inside the secondary capillaries 18. ARF designs of this type, with secondary and optionally smaller further capillaries, may be referred to as "nested antiresonant nodeless fibres", or NANFs [6].

Many other capillary configurations for the structured cladding of an ARF are possible, and the disclosure is not limited to the examples described above. For example, the capillaries need not be of circular cross-section, and/or may or may not be all of the same size and/or shape. The number of capillaries surrounding the core may be for example, four, five, six, seven, eight, nine or ten, although other numbers are not excluded.

The ring of cladding capillaries in an ARF creates a core boundary which has a shape comprising a series of adjacent inwardly curving surfaces (that is, convex from the point of view of the core). This contrasts with the usual outward curvature of the core-cladding interface in a conventional solid core fibre, and the substantially circular core boundary of a HCPBF (see FIG. 3). Accordingly, antiresonant hollow core fibres can be described as negative curvature fibres. The kagome category of ARF can also be configured as negative curvature fibres, and has a structured cladding of multiple small capillaries in an array, similar to HCPBF, but not configured to provide photonic bandgaps. In contrast to HCPBF, the guidance mechanism operates by antiresonance effects.

Herein, the terms hollow core optical fibre, hollow core fibre, hollow core waveguide, hollow core optical waveguide and similar terms are intended to cover optical waveguiding structures configured according to any of the above examples and similar structures, where light is guided by any of several guidance mechanisms (photonic bandgap guiding, antiresonance guiding, and/or inhibited coupling guiding) in a hollow elongate void or core surrounded by a structured cladding comprising a plurality of longitudinal capillaries. The capillaries comprise or define elongate holes, voids, lumina, cells or cavities which run continuously along the length or longitudinal extent of the optical fibre, substantially parallel to the elongate core which also extends continuously along the fibre's length. These various terms may be used interchangeably in the present disclosure.

The provision of an optical fibre adapter assembly as disclosed herein allows hollow core optical fibres to be utilised for optical fibre transmission paths in conjunction with existing and conventional transceiver and other equipment which is intended for use with conventional solid core optical fibres. By placing the join between hollow core fibre and solid core fibre within a self-contained adapter assembly which, once made, can be relatively compact and portable, the complexities of making this join can be carried out in an appropriate fabrication facility, with relevant tools, equipment and clean conditions to enable a high quality coupling. The adapter assembly can then be readily inserted between an end of an installed hollow core fibre cable and a solid core transceiver apparatus using simple splicing and connectorisation techniques that are suitable for straightforward implementation in the field, and often already well-established in common use.

Figure 6:
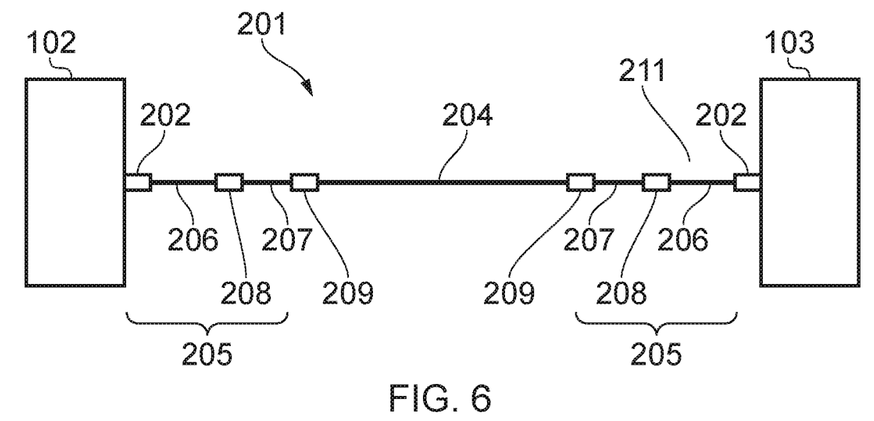
FIG. 6 shows a simplified schematic representation of an optical fibre signal transmission system incorporating hollow core optical fibres and optical waveguide adapter assemblies according to examples of the present disclosure.

FIG. 6 shows a simplified schematic representation of an example optical fibre signal transmission system 201 configured according to aspects of the present disclosure. As with the conventional system shown in FIG. 1, the system comprises an optical fibre cable 204 providing an optical fibre transmission path between a transmitter 102 and a receiver 103. However, in this case, the optical fibre cable 204 contains at least one hollow core optical waveguide or optical fibre. It may optionally also contain at least one solid core (single mode or multimode) optical waveguide or optical fibre. At each end of the cable 204, there is an optical fibre adapter assembly (alternatively, optical waveguide adapter assembly) 205 as proposed herein, which joins the cable 204 to the transceiver equipment 102, 103. An adapter assembly 205 may also be referred to as a fibre pigtail, a pigtail, or simply, a tail, since it forms an end portion or tail portion of the total cable. Each adapter assembly 205 comprises a mode field adapter 208 that optically couples a portion of hollow core optical fibre or waveguide 207 and a portion of solid core optical fibre or waveguide 206. The portion of hollow core fibre 207 is joined at its free end, remote from the mode field adapter 208, to the hollow core waveguide in the cable 204 by a splice 209. The portion of solid core fibre 206 is joined at its free end, remote from the mode field adapter 208, to the transceiver equipment 102, 103, by a splice 202 or via engaged connectors 202 provided on the transceiver equipment 102, 103 and on the end of the solid core fibre portion 206. Note that other optical components or additional lengths of solid core optical fibre could be included between the solid core fibre 206 of the adapter assembly 205 and the transceiver equipment 102, 103 at either or both ends of the transmission path, and additional lengths of hollow core optical fibre could be included between the hollow core fibre of the adapter assembly 205 and the cable 204.

An optical fibre transmission system will likely also include additional fibre components installed at locations along the transmission path. For example, erbium-doped fibre amplifiers (EDFAs) are commonly used to boost signal strength at intervals along a lengthy transmission path. These are necessarily and unavoidably based on optical gain media in the form of solid optical fibres, so are not directly compatible with hollow core fibres. However, adapter assemblies as disclosed herein could be used at the input and output of an EDFA or other solid fibre device such as a fibre filter or a reconfigurable optical add-drop multiplexer (ROADM)) to allow it to be integrated into a hollow core optical fibre transmission system.

Figure 7:
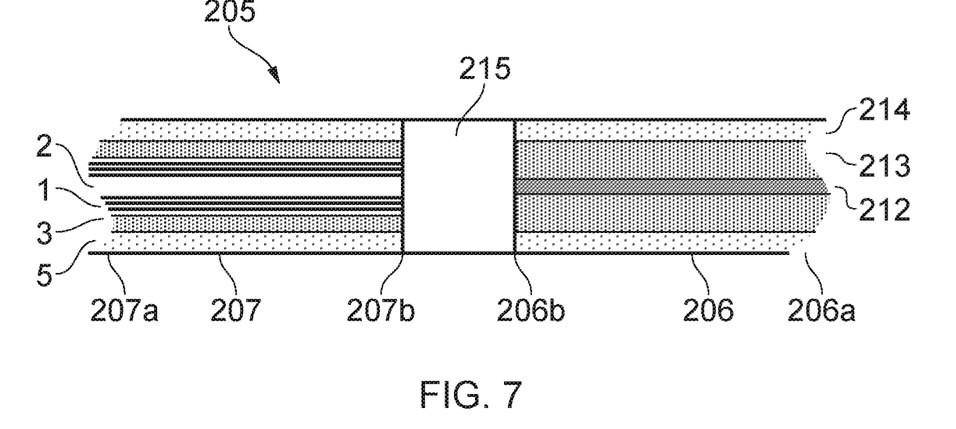
FIG. 7 shows a simplified schematic longitudinal cross-sectional view of an optical waveguide adapter assembly according to an example of the present disclosure.

FIG. 7 shows a simplified schematic longitudinal cross-section through an optical waveguide adapter assembly 205 according to an example. On a left side (as depicted) is a length or portion of hollow core optical waveguide 207. In line with the various types of hollow core optical fibre shown in FIGS. 3, 4 and 5, the hollow core waveguide portion has a central hollow core 2 surrounded by an inner cladding 1 comprising a structured arrangement of capillaries or longitudinal cavities extending along the length of the waveguide. An outer cladding 3 surrounds the inner cladding 1. A jacket 5, which may comprise one layer or coating or two or more different layers or coatings, configured to provide a protective outer surface for the hollow core waveguide 207, is provided around the outer cladding 3. The hollow core waveguide portion 207, typically of a longer length than shown in FIG. 7 which is not to scale, extends to a free end 207a intended to be joined by splicing to an end of a hollow core waveguide likely of the same or similar structure that is comprised within an optical fibre cable.

On the right side of the adapter assembly 205 is a length or portion of solid core waveguide 206, which may be of conventional construction, made from silica. It comprises a central solid core 212 surrounded by a solid cladding 213 (which may alternatively be structured, such as with elongate holes or lumina adjacent to the core 212 and extending through the cladding material substantially parallel to the core 212). The solid core waveguide 206 is configured for conventional waveguiding, in that the solid core 212 has a first refractive index value and the surrounding cladding 213 has a second refractive index value which is lower than the first refractive index value and provided by virtue of the material and/or structure of the cladding 213. Hence, light in one or more core modes is guided for propagation along the core 212 by total internal reflection at the core-cladding boundary in the known manner, owing to the refractive index difference between the core 212 and the cladding 213. The core index may be uniform or varying (graded) across the transverse profile of the waveguide. The core may usefully be configured to guide primarily one optical mode only, so the waveguide operates as a single mode waveguide, or in some circumstances it may be preferred to configure the core to support two or more optical modes for successful propagation, so the waveguide is a multimode waveguide. Various known mechanisms may, generally desirably or undesirably according to circumstances, couple some light from the core into the cladding, and the cladding itself may, generally undesirably, support one or more cladding modes. The core of the solid core waveguide may be formed from silica. The silica might be doped or undoped, and may or may not be fused. For example, the core may comprise silica (fused or unfused) which is doped with one or more of germanium, phosphorous and aluminium. Similarly, the cladding around the solid core may be formed from silica, which may be fused silica, and may or may not be doped. For example, the cladding may comprise silica doped with fluorine and/or boron, or fused silica doped with fluorine and/or boron. The solid core waveguide is not limited to being formed from silica, however, and other materials, with or without doping, may be used for either or both of the core and the cladding. Similarly, other dopant materials might be used. The solid core waveguide portion 206 further comprises a jacket 214 provided around the cladding 213, which may comprise one layer or coatings or two or more different layers or coatings, configured to provide a protective outer surface for the solid core waveguide 206. The solid core waveguide portion 206, typically of a longer length than shown in FIG. 7, extends to a free end 206a intended to be joined to a solid core waveguide in optical communication with transceiver equipment. This joint may be effected by splicing, or by connectorisation, in which case the free end 206a is fitted with a connector (not shown) configured to engage with a complementary connector on transceiver equipment or a length of solid core fibre intended to be coupled to transceiver equipment.

The ends 206b, 207b of the waveguide portions 206, 207 which are opposite to the free ends 206a, 206b by which the adapter assembly 201 can be connected into an optical signal transmission system are optically coupled to either side of a mode field adapter 215. Various designs of mode field adapter may be employed; some examples are described in more detail below.

Note that in the present disclosure, the terms "optical fibre", "fibre", "optical waveguide" and "waveguide" are in general used interchangeably, to designate an optical structure configured with a core and a cladding (of one or more layers) to enable waveguiding. The core and cladding may be embedded in or surrounded by various other layers, possibly together with other waveguide structures, such that the structure alone may not be considered as an optical fibre, or the core and cladding may have a simple coating or jacket arrangement to provide a fibre structure. However, use of the terms "optical fibre" and "fibre" are to be understood to also include a core and cladding arrangement not clearly coated or jacketed into a simple fibre format, and conversely the terms "optical fibre" and "optical waveguide" are to be understood to include a core and cladding plus a coat or jacket arrangement that provides a fibre format.

Similarly, the terms "optical fibre adapter assembly", "optical waveguide adapter assembly" and "adapter assembly" may be used interchangeably herein.

Figure 8:
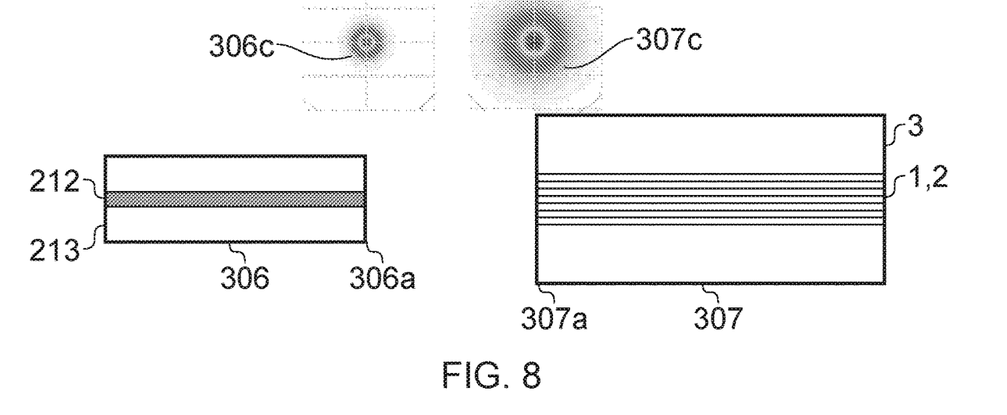
FIG. 8 shows schematic longitudinal cross-sectional views of a solid core optical fibre and a hollow core optical fibre plus representations of their respective transverse optical mode fields.

FIG. 8 is a simplified schematic longitudinal cross-sectional view of a solid core waveguide adjacent to a hollow core waveguide, to illustrate the optical situation which the optical fibre adapter assembly of the present disclosure aims to address. The solid core waveguide 306, shown for simplicity as a solid core 212 and surrounding cladding 213, is able to support a propagating optical wave or mode, by waveguiding along the core 212 as described. This mode, a fundamental core mode which the waveguide 306 is able to propagate, has a transverse optical field with a power or intensity distribution 306c as depicted in FIG. 8. The hollow core waveguide 307, shown for simplicity as a hollow core 2 and structured inner cladding 2 and surrounding outer cladding 3, similarly supports a fundamental core mode, which has a transverse optical field 307c as depicted in FIG. 8. While FIG. 8 is not precisely to scale, the relative sizes of the two waveguides and their corresponding optical fields are illustrative of reality in that the fundamental mode field 306c of a conventional solid core waveguide 306 typically has a much smaller diameter than the fundamental mode field 307c of a typical hollow core waveguide 307. The solid core waveguide mode field diameter may be half that of the hollow core waveguide, or less. Consequently, there is a significant size mismatch between the two optical mode fields 306c, 307c. If the adjacent ends 306b, 307b of the two waveguides 306, 307 were directly coupled together for optical communication from one waveguide core to the other waveguide core, there would be substantial loss of optical power. Also, there is often a mismatch in the outer diameter of the claddings 213, 3 of the two types of waveguide 306, 307, as in FIG. 8.

The present disclosure proposes to address this by use of a mode field adapter to join a portion of solid core fibre to a portion of hollow core fibre in an adapter assembly that can be pre-fabricated and made available to simplify the coupling of hollow core fibres to solid core fibres in the field. A mode field adapter is an optical waveguiding component or device that is able to alter the size of the transverse optical field of an optical mode propagating through it, along the waveguiding structure, making the mode field larger or smaller depending on the propagation direction. Hence, the mode field diameter of one fibre can be converted into the mode field diameter of another fibre (or a better approximation therefore). The mode fields are thereby "matched", enabling low loss optical propagation from one fibre to the other. Whilst known for coupling differently sized and configured solid core waveguides, mode field adapters are not commonly employed in conjunction with hollow core waveguides. The hollow core fibre is likely to support higher order modes, and successful, low loss coupling between the two fibre types requires matching of the fundamental modes while avoiding exciting these higher order modes in the hollow core waveguide. The higher order modes generally have much higher propagation losses than the fundamental mode, so are undesirable. The proposed adapter assembly can achieve this.

Figure 9:
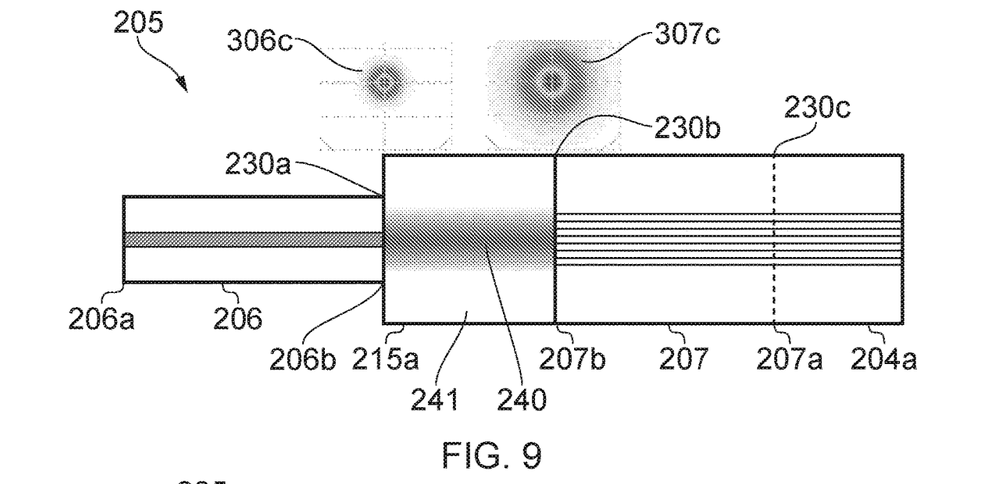
FIG. 9 shows a simplified schematic longitudinal cross-sectional view of a first example of an optical waveguide adapter assembly according to the present disclosure.

FIG. 9 shows a simplified transverse cross-sectional view of a first example optical waveguide adapter assembly. The adapter assembly 205 comprises a portion of solid core, single mode fibre 206 with a free end 206a, and an opposite end 206b which is optically coupled to a mode field adapter 215a by a splice 230a. There is also a portion of hollow core fibre 207 with a free end 207a and an opposite end 207b which is optically coupled to the mode field adapter 215a by a further splice 230b. The adapter assembly 205 is depicted as already installed in conjunction with a hollow core fibre 204a comprised in an optical fibre cable (204 in FIG. 6), or connected to such a hollow core fibre. The hollow core fibre portion 207 and the hollow core fibre 204a, which can be considered to be a transmission hollow core optical waveguide since it is intended to at least partially define an optical signal transmission pathway, are joined by a hollow core-to-hollow core splice 230c.

In this example, the mode field adapter 215a has the form of a portion of graded index (GRIN) optical fibre or waveguide. A GRIN fibre is one in which the core 240 has a non-constant refractive index value, in that, along the radius of the fibre's transverse cross-section, the refractive index has a maximum value at the centre of the core 240, and a gradually decreasing value towards the cladding 241 which surrounds the core 240. The refractive index value gradually tapers, typically following a parabolic profile, so as to match the value of the cladding refractive index at the core-cladding boundary, as indicated by the shaded depiction of the core 240 in FIG. 9. This structure removes the sudden step-change transition of refractive index values at the core-cladding interface of a regular solid core fibre, and enables the GRIN fibre to support changing sizes of optical mode field. The graded refractive index allows the fibre to have a focusing effect and act as a lens; a short length of GRIN fibre suitable for a mode field adapter can be termed as a GRIN fibre lens. Accordingly, a small mode field 306c entering the mode field adapter 215a from the solid core fibre portion 206 is enlarged as it propagates along the mode field adapter 215a, until it achieves a larger mode field size 307c able to propagate smoothly at low loss from the mode field adapter 215a into the hollow core fibre portion 207, and vice versa for an opposite propagation direction. A GRIN fibre lens suitable for use in the optical waveguide adapter assembly 205 may have a length of the order of 500 µm or less, being a quarter of the pitch of the GRIN fibre [9, 10]. The optimum length will depend on the diameters for the small mode field 306c and the large mode field 307c. Apparatus to cleave optical fibres accurately to such small lengths (for example, to within ±10 µm of the optimum length) is not widely available and is ill-suited to non-specialist use, so this approach for coupling solid core and hollow core fibres is not appropriate for use in the field. By utilising a GRIN fibre within an adapter assembly as proposed herein the benefit of the mode-matching capability of GRIN lens is made available in a field-deployable format.

Figure 10:
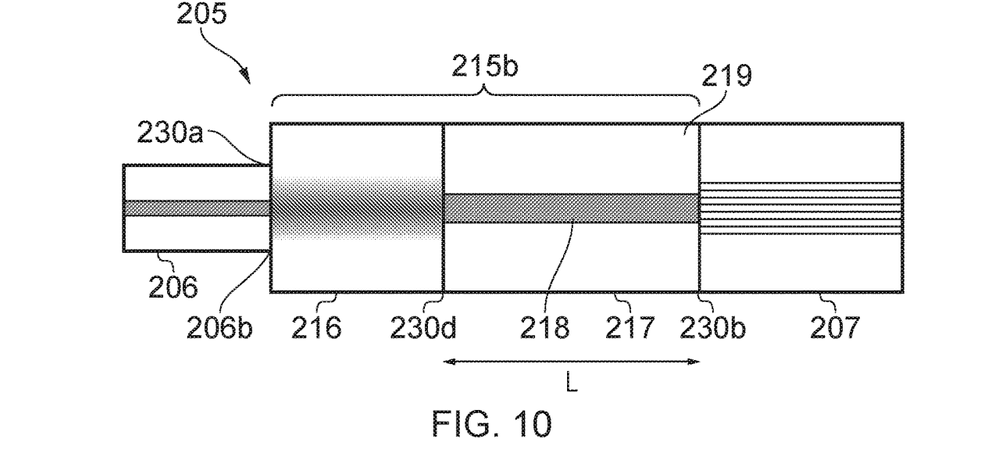
FIG. 10 shows a simplified schematic longitudinal cross-sectional view of a second example of an optical waveguide adapter assembly according to the present disclosure.

FIG. 10 shows a simplified transverse cross-sectional view of a second example optical waveguide adapter assembly, which is a modified version of the example of FIG. 10. In this example the mode field adapter 215b comprises a portion of GRIN fibre 216, as in FIG. 9. The solid core waveguide 206 has its second end 206b coupled to the GRIN fibre 216 at a splice 230a. However, interposed between the GRIN fibre 216 and the hollow core fibre 207 is a portion of large mode area (LMA) optical fibre or waveguide 217. LMA fibre is a type of solid core fibre with a larger core 218 (and typically larger cladding 219), and hence larger mode field size, than the solid core fibres typically used in optical transmission systems, and able to support a single transverse optical mode or a few modes only. The LMA fibre portion 217 can therefore be selected to have substantially the same or similar mode field size to the hollow core fibre portion 207, and to the enlarged mode field size available from the GRIN fibre 216. In other words, the LMA mode field is matched to the hollow core fibre portion 207 and the GRIN fibre 216. The LMA fibre portion 217 is optically coupled by splices 230b, 230d to the hollow core fibre portion 207 and the GRIN fibre 216. The LMA fibre portion 217 has a length L which is not critical and can be chosen as convenient having regard to the desired overall size of the adapter assembly 205. For example, L may be between about 500 µm and about 1000 µm. The inclusion of the LMA fibre portion 217 increases the overall length of the mode field adapter 215b and hence makes splicing between the mode field adapter 215b and the hollow core fibre portion 207 more accessible, so that distortion of the complex structured cladding of the hollow core fibre portion 207 can be reduced or minimised, so reducing the transmission loss, compared to direct splicing to the GRIN fibre 216 as in the FIG. 9 example. The manufacturing of the adapter assembly 205 is made more burdensome by the inclusion of an additional component, but the overall optical performance can be improved by better preservation of the hollow core fibre structure.

Figures 11, 11A:
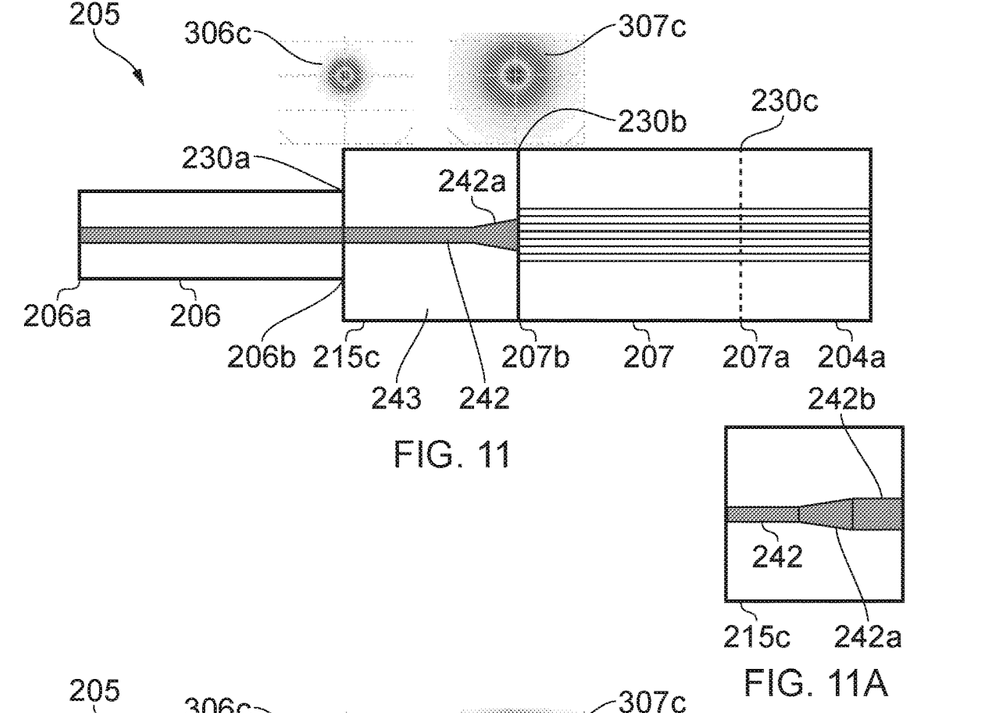
FIG. 11 shows a simplified schematic longitudinal cross-sectional view of a third example of an optical waveguide adapter assembly according to the present disclosure.
FIG. 11A shows a simplified schematic longitudinal cross-sectional view of a modified version of a mode field adapter from the example of FIG. 11.

FIG. 11 shows a simplified transverse cross-sectional view of a third example optical waveguide adapter assembly. The adapter assembly 205 comprises, as before, a portion of solid core, single mode fibre 206 with a free end 206a, and an opposite end 206b which is optically coupled to a mode field adapter 215c by a splice 230a. There is also a portion of hollow core fibre 207 with a free end 207a and an opposite end 207b which is optically coupled to the mode field adapter 215c by a further splice 230b. The adapter assembly 205 is depicted as already installed with a hollow core fibre 204a comprised in an optical fibre cable (204 in FIG. 6) or connected to such a hollow core fibre. The hollow core fibre portion 207 and the hollow core fibre 204a are joined by a hollow core-to-hollow core splice 230c. In this example, the mode field adapter 215c comprises a short additional portion of solid core fibre, which may have the same or similar physical structure as the solid core fibre portion 206. Alternatively, it may be an end part of the solid core fibre portion 206, so that the solid core fibre portion 206 and the mode field adapter 215c are a continuation of the same waveguide, and the splice 230a being absent. In order to provide the desired mode matching, the mode field adapter 215c, comprising a solid core 242 surrounded by a cladding 243, has its core 242 thermally expanded at the side proximate the hollow core fibre portion 207. Hence, the core 242 has an increased width at the end proximate the hollow core fibre portion 207 compared to the end proximate the solid core fibre portion 206. The width of the core 242 at the end of the mode field adapter 215c which is in optical communication with the solid core fibre portion 206 is appropriate to support a mode substantially matched in size to the mode field 306c of the solid core fibre portion 206, and the width of the core 242a at the opposite end of the mode field adapter 215c, spliced to the hollow core fibre portion 207, is greater and appropriate to support a mode substantially matched in size to the mode field 307c of the hollow core fibre portion 207.

Thermal expansion is a technique for increasing the core size of a solid core optical waveguide. A single mode solid core optical waveguide has a core of doped material and a cladding of material which may also be doped. Local heating of a portion of the fibre along which thermal expansion of the core is required to a high temperature (such as in the range 1300 to 1450° C.) causes thermal diffusion of the dopant or dopants, which changes the local value of the refractive index since this depends on dopant concentration. Hence, the core width increases and the core's average refractive index decreases, and hence the core is able to support a larger mode field diameter, which in the present case can be matched to the mode field 307c of the hollow core fibre portion 207. To create the mode field adapter 215c, the thermal expansion can be implemented either before or after the portion of single mode solid core fibre providing the mode field adaptation has been spliced to the solid core fibre portion 206 at splice 230a. Further information on thermal expansion can be found in [11, 12].

FIG. 11A shows a transverse cross-sectional view of a modified version of the mode field adapter 215c of the FIG. 11 example. In this version, the core 242 has a portion of narrow width mode-matched to the mode field of the solid core fibre portion 206, as before, and a portion 242a of increasing width formed by thermal expansion, also as before. Additionally, a portion 242b of core with constant width matching the expanded width follows from the expanded core region, for coupling to the hollow core fibre portion 207. This larger width portion 242b can be formed by thermal expansion together with formation of the increasing width portion 242a, or it may provided by splicing a length of solid core fibre with a larger core onto the thermally expanded core.

Figures 12, 12A:
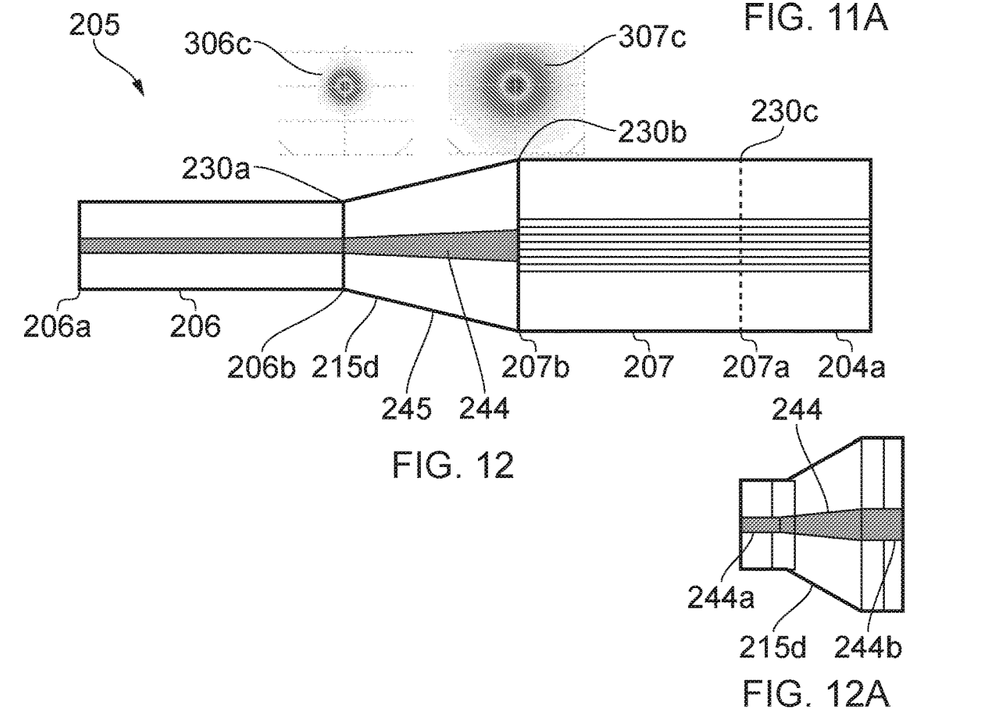
FIG. 12 shows a simplified schematic longitudinal cross-sectional view of a fourth example of an optical waveguide adapter assembly according to the present disclosure.
FIG. 12A shows a simplified schematic longitudinal cross-sectional view of a modified version of a mode field adapter from the example of FIG. 12.

FIG. 12 shows a simplified transverse cross-sectional view of a fourth example optical waveguide adapter assembly. The adapter assembly 205 comprises, as before, a portion of solid core, single mode fibre 206 with a free end 206a, and an opposite end 206b which is optically coupled to a mode field adapter 215d by a splice 230a. There is also a portion of hollow core fibre 207 with a free end 207a and an opposite end 207b which is optically coupled to the mode field adapter 215d by a further splice 230b. The adapter assembly 205 is depicted as already installed with a hollow core fibre 204a comprised in an optical fibre cable (204 in FIG. 6) or connected to such a hollow core fibre. The hollow core fibre portion 207 and the hollow core fibre 204a are joined by a hollow core-to-hollow core splice 230c. In this example, the mode field adapter 215d comprises a short length of solid core optical waveguide or fibre having a tapered portion. The core 244 of this waveguide has a width (diameter) that increases with distance along the length of the tapered waveguide in the direction from the solid core fibre portion 206 to the hollow core fibre portion 207. The cladding 245 of the tapered waveguide surrounds the core 244 and has a similarly increasing width. In order to provide the desired mode matching, the core 244 of the mode field adapter 215d has a width at the end of the mode field adapter 215d which is in optical communication with the solid core fibre portion 206 that is appropriate to support a mode substantially matched in size to the mode field 306c of the solid core fibre portion 206, and the width of the core 244 at the opposite end of the mode field adapter 215d, spliced to the hollow core fibre portion 207, is greater and appropriate to support a mode substantially matched in size to the mode field 307c of the hollow core fibre portion 207.

Tapered waveguides of this type are known [13], and maintain a constant core and cladding refractive index through the taper. This is in contrast to the thermally expanded core mode field adapter of the FIG. 11 example, where the refractive index of the core, and possibly the cladding, is changed in the portion of expanded core. by the application of heat.

FIG. 12A shows a transverse cross-sectional view of a modified version of the mode field adapter 215d of FIG. 12. In this version, the tapered core 244 occupies a central part of the mode field adapter 215d only, and portions of solid core waveguide of constant core width are provided at either end of the tapered portion 244. A smaller core 244a with a width matched to the narrow end of the tapered portion 244 is provided at the end where the solid core fibre portion 206 is coupled to the mode field adapter 215d, and a large core 244b with a width matched to the wider end of the tapered portion 244 is provided at the end where the hollow core fibre portion 207 is coupled to the mode field adapter 215d. The mode field adapter 215d may be fabricated directly with the illustrated core profile, that is, a narrow constant width followed by an increasing width taper followed by a wide constant width, or may be fabricated by splicing a length of waveguide with a narrow constant width core to the narrow core end of a tapered waveguide, and splicing a length of waveguide with a wide constant core width to the wide core end of the tapered waveguide.

Figure 13:
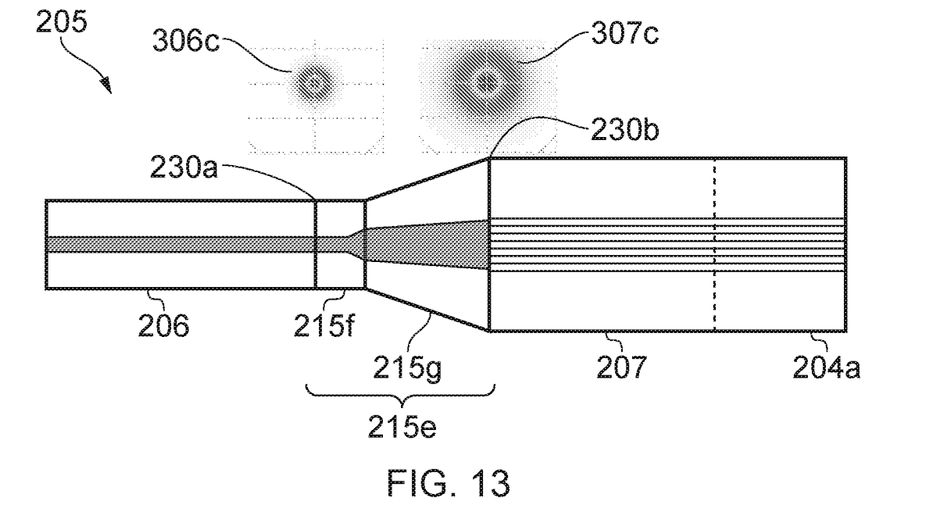
FIG. 13 shows a simplified schematic longitudinal cross-sectional view of a fifth example of an optical waveguide adapter assembly according to the present disclosure.

FIG. 13 shows a simplified transverse cross-sectional view of a fifth example optical waveguide adapter assembly. This fifth example is a combination of the third and fourth examples, in that the mode field adapter 215e comprises a portion of waveguide 215f with a thermally expanded core, similar to the mode field adapter 215c of FIG. 11, coupled by a splice to a portion of tapered waveguide 215g similar to the mode field adapter 215d of FIG. 12 (or to the mode field adapter of FIG. 12A, with untapered core portions at each end of the tapered portion). The thermally expanded part of the core of the waveguide portion 215f is mode-matched to the smaller end of the tapered core of the tapered waveguide 215g, while the other ends of these cores, and hence the core ends of the mode field adapter 215e overall, are matched to the mode field sizes 306c, 307c of the solid core fibre portion 206 and the hollow core fibre portion 207, to provide mode matching over the adapter assembly 205, as before.

In the case of the various examples including a portion of core with a tapering width (both the tapered waveguide designs and the thermally expanded core designs), the length of core over which the taper extends can be selected with reference to a requirement for adiabaticity. If the taper is too short it will become lossy, so can be made of sufficient length to reduce loss below a desired threshold level.

Other alternatives and modifications for implementing the mode field adaption capability to achieve mode matching between the solid core fibre portion and the hollow core fibre portion of an optical fibre adapter assembly as disclosed herein will be apparent to the skilled person, and are not excluded from the scope of the disclosure.

Figure 14:
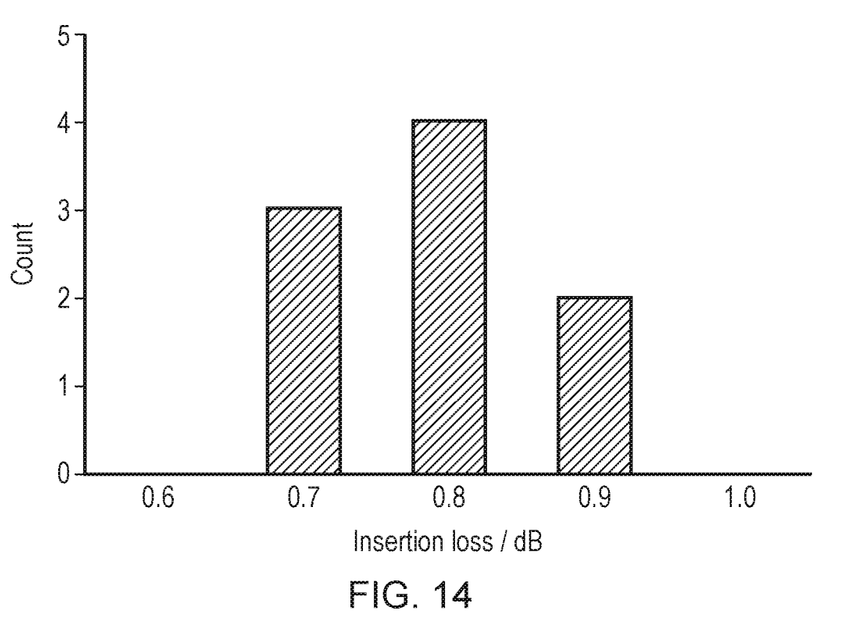
FIG. 14 shows a bar chart of insertion loss measurements recorded from optical waveguide adapters according to the disclosure.

FIG. 14 shows a bar chart of the amount of optical loss measured from optical propagation through mode field adapters in line with the present disclosure and inserted between a length of solid core fibre and a length of hollow core fibre (insertion loss, indicating reduction in optical power across the mode field adapter). The mode field adapters were configured in accordance with the example of FIG. 10, with a standard single mode optical fibre as the solid core fibre portion, a mode field adapter comprising a GRIN fibre with a 50 µm diameter core and a LMA fibre with a 20 µm mode field diameter, and a hollow core fibre portion comprising HCPBF with a mode field diameter of 20 µm. From nine such mode field adapters, an insertion loss of 0.7 dB was measured for three adapters, an insertion loss of 0.8 dB was measured for four adapters, and an insertion loss of 0.9 dB was measured for two adapters. This corresponds to an average insertion loss of about 0.79 dB, which is an acceptably low level for practical use.

An optical waveguide adapter assembly as described herein may be modified to reduce losses further, by the inclusion of features at all or any of the splice locations (either between the fibre portions and the mode field adapter or at the free ends of the fibre portions). A first option is the use of angled facets, where the end of a fibre is tailored so that the facet or end face lies in a plane which is non-perpendicular to the longitudinal axis of the fibre. This is intended to reduce back reflections at the facet. If angled facets are used to join a hollow core waveguide and a solid core waveguide, such as at the splice location 230b at the coupled end of hollow core waveguide portion in the illustrated examples, the two faceted ends should be angled so that when joined, there is an angle between the longitudinal axes of the hollow core waveguide and the solid core waveguide in order to avoid or reduce transmission loss caused by refraction at the facet. An alternative option is the use of antireflection coatings on the ends of the fibre portions. If used on the free end of the hollow core fibre portion, the risk of thermal damage (to which antireflection coatings are susceptible) should be taken into account when forming the splice between the hollow core fibre portion and the hollow core waveguide of the transmission path. Fusion splicing may be deemed unsuitable since the various techniques involve significant temperature increases, so mechanical splicing may be preferred. Antireflection coatings and angled facets may be used together.

Optical waveguide adapter assemblies according to the present disclosure can be provided as individual components ready to be used to interconnect hollow core optical fibres with solid core fibre-based transceiver and other equipment once the hollow core fibre has been installed or deployed in its required location for use, such as to provide an optical signal pathway in an optical signal transmission system. Alternatively, an adapter assembly can be joined to a hollow core optical fibre before it is installed, and then used to effect connection of the hollow core fibre to the transceiver equipment. In either case, the hollow core fibre can be an individual waveguide or fibre or fibre strand, or may be two or more hollow core fibres or waveguides grouped together in a fibre bundle or ribbon or cable (where a cable itself might include several bundles or ribbons in some cases). Any group of fibres might also include any number of non-hollow core fibres too. Also, for convenience, two or more adapter assemblies might be packaged together within a single housing or jacket or other outer layer so that multiple hollow core fibres in a group can be connected to multiple solid core fibres by a single component.

Note that the drawings of FIGS. 9 to 13 show the waveguide portions 206, 207 and the mode field adapter as core-plus-cladding structures only. This is for simplicity of depiction, and in reality the waveguides will include one or more additional layers, coating, jackets or the like around the cladding, as described with respect to and shown in FIG. 7. For optimum protection and improved appearance, an adapter assembly may be provided with a continuous jacket layer covering the solid core waveguide portion, the mode field adapter and the hollow core waveguide portion in unitary manner, which is applied after the waveguide portions have been spliced to either side of the mode field adapter. Alternatively or additionally, an adaptor assembly may be protected and given an improved appearance with an external housing or package.

The splicing together of the various components in an adapter assembly can be carried out according to any preferred splicing technique, such as by fusion splicing, using an arc, a laser or a heated filament, or a mechanical splicing method, or a combination of fusion splicing and mechanical splicing. Splicing provides a robust join between the components so as to enable high performance low loss optical coupling between the waveguiding cores of the hollow core waveguide portion, the solid core waveguide portion and the mode field adapter. However, other coupling techniques suitable for enabling the required optical coupling may be used.

Figure 15:
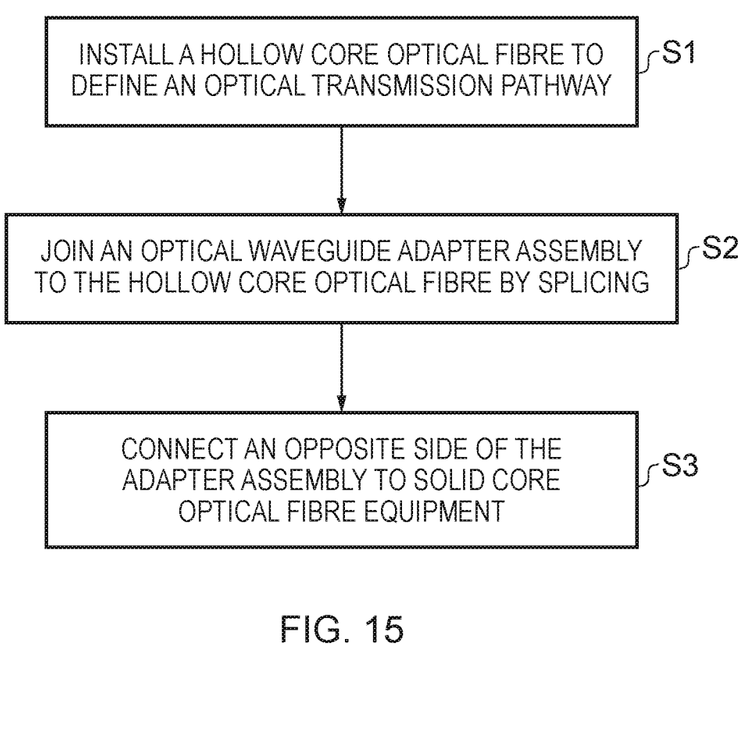
FIG. 15 shows a flow chart of steps in an example method in which an optical waveguide adapter assembly according to the present disclosure may be used.

FIG. 15 is a flow chart of steps in an example method in which an optical waveguide adapter assembly as disclosed herein may be used. In a first step S1, a hollow core optical fibre or waveguide is deployed or installed so as to form, provide or define a transmission pathway for optical signals. For example, the pathway could be in a telecommunications system. The hollow core fibre could be installed in isolation or could be comprised within a fibre cable or other group or bundle of optical fibres or waveguides, where the deployment is a deployment of the cable. Once installed, testing may be carried out on the fibre cable or the fibre to determine if the deployment has been successful so that the fibre is operable for its intended purpose.

In a second step S2, an optical waveguide adapter assembly according to the present disclosure is joined to the hollow core optical fibre. The join is implemented by splicing the free end of the hollow core fibre portion of the adapter assembly to the end of the hollow core optical fibre.

Then, in a third step S3, the optical waveguide adapter assembly is connected to equipment or apparatus configured for operation with solid core waveguides, such as a transmitter or receiver (transceiver) in a telecommunications system, to achieve an optical link between the cable and the equipment. This connection is implemented by joining the free end of the solid core fibre portion of the adapter assembly, on an opposite side or end of the adapter assembly to the hollow core fibre portion, to a solid core fibre associated with or connectable to the equipment. The join may be a splice, or may be the mechanical attachment or coupling of a connector on the free end of the solid core fibre portion to a corresponding connector on the equipment or on the end of a solid core fibre that is otherwise intended to be coupled to the equipment.

If the hollow core optical fibre is one of a group of hollow core optical fibres installed for the transmission pathway such as a plurality of hollow core optical fibres in a fibre cable, the steps S2 and S3 may be repeated so as to connect each hollow core optical fibre to solid core fibre equipment. Also, the steps S2 and S3 will be repeated to make a corresponding interconnection or interconnections at the other end of the hollow core fibre or fibre cable.

The steps S2 and S3 may be performed in the reverse order, so that the adapter assembly is coupled to the equipment prior to being coupled to the hollow core optical fibre.

In a further alternative, the steps S1 and S2 may be performed in the reverse order, so that the adapter assembly is secured to the hollow core optical fibre before the hollow core optical fibre is installed, and the final connection to the equipment in step S3 is made following the installation of step S1.

Still further, the step S2 might be performed first to couple one or more adapter assemblies to a first end of the hollow core fibre or fibre cable. Then, the fibre or fibre cable is installed in line with step S1. Then, step S2 is repeated to couple one or more adapter assemblies to the other end of the hollow core fibre or fibre cable. The connection(s) to the solid core optical fibre equipment in step S3 may be made before or after step S2 both before and after the installation of step S1.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] J Wooler et al, "Overcoming the challenges of splicing dissimilar diameter solid-core and hollow-core photonic band gap fibers", Workshop on Speciality Optical Fibers and their Applications, Optical Society of America, 2013
[2] J Wooler et al, "Robust low loss splicing of hollow core photonic bandgap fiber to itself", Proc. Opt. Fiber Commun. Conf., 2013
[3] U.S. Pat. No. 9,904,008
[4] WO 2015/185761
[5] S E Barkou et al, "Photonic bandgap fibers", LEOS '99, IEEE Lasers and Electro-Optics Society 1999 12th Annual Meeting, vol. 2 IEEE, 1999
[6] J Broeng et al, "Analysis of air-guiding photonic bandgap fibers", Optics Letters vol. 25(2), 96-98, 2000
[7] Francesco Poletti, "Nested antiresonant nodeless hollow core fiber," Opt. Express, vol. 22, 23807-23828, 2014
[8] J R Hayes et al, "Antiresonant hollow core fiber with an octave spanning bandwidth for short haul data communications", Journal of Lightwave Technology vol. 35(3), 437-442, 2017
[9] U.S. Pat. No. 6,839,483
[10] P Hofman et al, "Detailed investigation of mode-field adapters utilizing multimode-interference in graded index fibers", Journal of Lightwave Technology vol. 30(14), 2289-2298, 2012
[11] U.S. Pat. No. 6,336,749
[12] M Faucher and Y K Lize, "Mode field adaptation for high power fiber lasers", Conference on Lasers and Electro-Optics, Optical Society of America, 2007
[13] D B Mortimore and J V Wright, "Low-loss joints between dissimilar fibres by tapering fusion splices", Electronics Letters vol. 22(6), 318-319, 1986

The invention claimed is:

1. An optical waveguide adapter assembly comprising:
a solid core optical waveguide extending between a free end and a coupled end and having a solid waveguiding core with an associated first optical mode field size;
a hollow core optical waveguide extending between a free end and a coupled end and having a hollow waveguiding core with an associated second optical mode field size; and
an optical mode field adapter extending between a first end and a second end and having a waveguiding core having a shape, a refractive index property, or a combination thereof that changes an optical mode field of a waveguided optical signal substantially between the first optical mode field size at the first end of the optical mode field adapter and the second optical mode field size at the second end of the optical mode field adapter, wherein:
the first end of the optical mode field adapter is joined to the coupled end of the solid core optical waveguide to provide optical coupling between the waveguiding core of the solid core optical waveguide and the waveguiding core of the optical mode field adapter, and
the second end of the optical mode field adapter is joined to the coupled end of the hollow core optical waveguide to provide optical coupling between the waveguiding core of the hollow core optical waveguide and the waveguiding core of the optical mode field adapter.

2. An optical waveguide adapter assembly according to claim 1, in which the hollow core optical waveguide is a photonic bandgap waveguide configured to guide light along the hollow waveguiding core by a photonic bandgap effect, the hollow waveguiding core surrounded by an inner cladding comprising a microstructured regular array of longitudinally extending capillaries.

3. An optical waveguide adapter assembly according to claim 1, in which the hollow core optical waveguide is an antiresonant waveguide configured to guide light along the hollow waveguiding core by an antiresonant effect, the hollow waveguiding core surrounded by an inner cladding comprising a ring of longitudinally extending capillaries.

4. An optical waveguide adapter assembly according to claim 3, in which the hollow core optical waveguide is a nested antiresonant nodeless hollow core waveguide, the inner cladding comprising one or more additional capillaries nested within each longitudinally extending capillary.

5. An optical waveguide adapter assembly according to claim 1, in which the first optical mode field size is smaller than the second optical mode field size.

6. An optical waveguide adapter assembly according to claim 1, in which the solid core optical waveguide comprises a single mode optical waveguide with a doped or undoped silica waveguiding core.

7. An optical waveguide adapter assembly according to claim 1, in which the optical mode field adapter comprises a graded index optical waveguide having a core with a non-constant refractive index value that has a maximum value at the center of the core and a gradually decreasing value towards a cladding that surrounds the core.

8. An optical waveguide adapter assembly according to claim 7, in which the optical mode field adapter additionally comprises a large mode area optical waveguide having a solid waveguiding core with an associated optical mode field size substantially matched to the second optical mode field size, the large mode area optical waveguide joined between the graded index optical waveguide and the hollow core optical waveguide.

9. An optical waveguide adapter assembly according to claim 1, in which the optical mode field adapter comprises a further solid core optical waveguide having a solid waveguiding core enlarged by thermal expansion at the second end of the optical mode field adapter.

10. An optical waveguide adapter assembly according to claim 9, in which the further solid core optical waveguide is a portion of the solid core optical waveguide at its coupled end.

11. An optical waveguide adapter assembly according to claim 1, in which the optical mode field adapter comprises a further solid core optical waveguide with a solid waveguiding core tapered over at least part of its length.

12. An optical waveguide adapter assembly according to claim 9, in which the optical mode field adapter additionally comprises a second further solid core optical waveguide with a tapered solid waveguiding core, the second further solid core optical waveguide joined between the further solid core optical waveguide and the hollow core optical waveguide.

13. An optical waveguide adapter assembly according to claim 1, in which the optical mode field adapter is joined to one or both of the solid core optical waveguide and the hollow core optical waveguide by a splice.

14. An optical waveguide adapter assembly according to claim 1, and further comprising a mechanical connector at the free end of the solid core optical waveguide configured for engagement with a mechanical connector on equipment to enable optical coupling into and out of the solid core optical waveguide.

15. An optical waveguide adapter assembly according to claim 1, and further comprising one or more additional optical waveguide adapter assemblies and an outer jacket housing all the optical waveguide adapter assemblies as a single component.

16. An optical waveguide adapter assembly according to claim 1, and further comprising a transmission hollow core optical waveguide for defining an optical signal transmission pathway joined to the free end of the hollow core optical waveguide by a splice.

17. An optical waveguide adapter assembly according to claim 16, in which the transmission hollow core optical waveguide is comprised within an optical fibre cable.

18. An optical fibre cable comprising at least one transmission hollow core optical waveguide for defining an optical signal transmission pathway, and an optical waveguide adapter assembly according to claim 1 optically coupled to at least one end of the at least one transmission hollow core optical fibre.

19. An optical signal transmission system comprising an optical signal transmitter, an optical signal receiver, an optical fibre cable housing at least one transmission hollow core optical waveguide defining an optical signal transmission pathway between the optical signal transmitter and the optical signal receiver, a first optical waveguide adapter assembly according to claim 1 optically interconnecting the transmitter and a first end of the at least one transmission hollow core optical waveguide, and a second optical waveguide adapter assembly according to claim 1 optically interconnecting the receiver and a second end of the at least one transmission hollow core optical waveguide.

20. A method of installing an optical signal transmission system comprising:
deploying a transmission hollow core optical waveguide to define an optical signal transmission pathway;
joining an optical waveguide adapter assembly according to claim 1 to the transmission hollow core optical waveguide by forming a splice between the free end of the hollow core optical waveguide of the optical waveguide adapter assembly and a first end of the transmission hollow core optical waveguide; and
joining the free end of the solid core optical waveguide of the optical waveguide adapter assembly to form an optical coupling with first optical transceiver equipment.

21. A method according to claim 20, further comprising joining a second optical waveguide adapter assembly to a second end of the transmission hollow core optical waveguide and to second optical transceiver equipment.

22. A method according to claim 20, in which the transmission hollow core optical waveguide is comprised within an optical fibre cable.

* * * * *